United States Patent
Lord

(10) Patent No.: US 9,483,356 B2
(45) Date of Patent: Nov. 1, 2016

(54) HEURISTIC JOURNAL RESERVATIONS

(71) Applicant: Stephen P. Lord, Prior Lake, MN (US)

(72) Inventor: Stephen P. Lord, Prior Lake, MN (US)

(73) Assignee: Quantum Corporation, San Jose, CA (US)

(*) Notice: Subject to any disclaimer, the term of this patent is extended or adjusted under 35 U.S.C. 154(b) by 533 days.

(21) Appl. No.: 13/787,456

(22) Filed: Mar. 6, 2013

(65) Prior Publication Data

US 2014/0258671 A1 Sep. 11, 2014

(51) Int. Cl.
*G06F 12/02* (2006.01)
*G06F 11/14* (2006.01)
*G06F 17/30* (2006.01)
*G06F 11/00* (2006.01)

(52) U.S. Cl.
CPC ........... *G06F 11/1448* (2013.01); *G06F 11/00* (2013.01); *G06F 12/023* (2013.01); *G06F 17/30* (2013.01); *G06F 11/1471* (2013.01)

(58) Field of Classification Search
CPC .................................................. G06F 11/1448
See application file for complete search history.

(56) References Cited

U.S. PATENT DOCUMENTS

| | | | | |
|---|---|---|---|---|
| 7,111,136 | B2* | 9/2006 | Yamagami | 711/162 |
| 2009/0077557 | A1* | 3/2009 | Ichikawa et al. | 718/102 |
| 2011/0191522 | A1* | 8/2011 | Condict et al. | 711/103 |
| 2014/0095758 | A1* | 4/2014 | Smith et al. | 710/308 |

* cited by examiner

*Primary Examiner* — Charles Rones
*Assistant Examiner* — Ryan Dare
(74) *Attorney, Agent, or Firm* — Eschweiler & Associates, LLC

(57) ABSTRACT

Example apparatus and methods reserve space in a journal using an observation based approach instead of a fixed sized approach or a worst case scenario approach. One example method receives a request to allocate space in a journal to support a file system transaction. The example method reserves an amount of space in the journal based on a pre-existing reservation size estimate. Unlike conventional systems, the estimate is not based on a worst-case scenario. The example method observes the actual amount of storage used in the journal by the file system transaction and then selectively automatically adjusts the pre-existing reservation size estimate. The estimate may slowly shrink if no overflows are encountered but may quickly grow if an overflow is detected.

15 Claims, 7 Drawing Sheets

HEURISTIC JOURNAL RESERVATIONS

BACKGROUND

File systems store files and store information about files. The information stored in files may be referred to as data. The information about files may be referred to as metadata. When the data in a file changes, a file system may want to update the metadata about that file. For example, if the contents of a file are changed, the file system may want to memorialize the time at which the change was made and by whom the change was made. A journal may be employed to protect the data and metadata in a file system.

Making a change to a file may require the file system to perform updates to several independently stored pieces of metadata that the underlying storage does not support as an atomic operation. This set of changes takes the file system from one consistent state to another. Undesirable conditions may arise if a series of operations are only partially recorded. Thus, a file system may be required to treat a series of operations as a transaction. Example transactions may include allocating space for a file, creating a file, updating a file, deleting a file, or other operations. While the file system may choose to treat operations as a transaction, an underlying operating system or other actor (e.g., storage system) may only be able to guarantee that individual members of the series of operations are performed as atomic operations.

Therefore, file systems may use a journal to help support correctly performing a series of operations as a single file system transaction. The journal may be, for example, a disk-based structure that can store information about operations to be performed to transition a file system from a first state to a second state. The journal may be used to store a complete representation of the set of operations that are to be completed for the file system transaction. For example, the journal may store a linear sequence of underlying operations that are to be performed as part of the file system transaction. Once the set of operations to be performed are written in the journal, the individual updates to metadata can be performed safely in the knowledge that if something goes wrong, it is possible to recover the complete set and reapply them later using the information stored in the journal.

A journal may play a record-keeping role to allow for safe transitions from one stable state to another stable state in a file system in a manner that can be guaranteed by the infrastructure underlying the file system. A journal provides a persistent structure that allows the file system to restore itself to a self-consistent state by examining its contents after a crash and using them to reconstruct the recently updated metadata components to a consistent state.

One issue with file systems arises due to the difference in latency between memory and non-memory (e.g., disk, tape) storage. This latency can produce conditions where changes made in one area (e.g., memory) are out of sync with changes made in another area (e.g., disk). Additionally, this latency motivates a file system to store in memory changes that are to be made to data on disk and then to make the actual changes on disk at a later time. For example, a series of reads and writes to a file may be made virtually in memory and then only made physically on disk at a later time. While this delayed update approach may solve one problem associated with excessive random input/output (i/o), it may produce another problem associated with memory and disk being out of sync. The file system metadata may indicate that a change has been made, and that change may have been performed in memory, but the actual underlying data on disk may not have been changed.

A journal may be used to protect the state of things that are only in memory. The journal may be used to record, in persistent storage (e.g., disk, solid state drive) the changes that have been made in memory but that have not yet been propagated to persistent storage. When the changes have been propagated to persistent storage, the journal entries that were protecting the changes can be discarded. More generally, the journal can be used to transfer in-memory state to on-disk state. The in-memory state may be useful to a running program that does not have time to wait for disk i/o and the on-disk state may be useful as a recovery tool. For example, if the running system terminates unexpectedly, the journal may be used to determine which transactions need to be replayed to return the file system back to a stable point before the failure.

While a journal facilitates mitigating some issues with a file system, the journal may produce new issues. One issue concerns the journal having a finite size and thus becoming full. Unlike database journals, file system journals are typically implemented as a circular buffer on disk. New transactions are recorded at the 'head' of the journal, and the oldest transactions still protected by the journal are at the 'tail' of the journal. The 'head' of the journal cannot be allowed to overrun the 'tail' without first protecting the old transactions by flushing their individual metadata updates out to disk. If the journal head was allowed to overwrite the tail, then information will be over-written, creating conditions under which the journal is no longer providing consistency protection for the file system.

Before starting a journal transaction, a determination may be made to discover whether there is sufficient free space to support the transaction. Conventionally, a "worst case scenario" approach to transaction space usage has been taken. There are at least two problems with the worst-case scenario. First, it is difficult to calculate what the actual worst-case scenario is and this calculation tends to be an error prone part of the system. The calculation of the worst case scenario may be significantly too large, or, even worse, might not be big enough. Second, because being too small is calamitous, the worst-case scenario typically significantly over-estimates the amount of free space required for a transaction with many data structures, the worst-case size may be several orders of magnitude larger than the average use case. Always reserving the largest possible amount of space is inefficient and produces undesired pressure on the journal to flush metadata.

Another issue concerning allocating space in the journal is the required flush of old metadata. Before allocating space in the journal, conventional systems first insured that the material in the journal being overwritten was stable. This requires writing out all the metadata that would be overwritten by the worst case space reservation. The larger this reservation is, the more metadata needs to be flushed while holding up new activity in the file system. Since the worst case reservation can be so much larger than the actual used space, this can cause excessive flushing of state and slower operation than would otherwise be possible.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Figure 1:
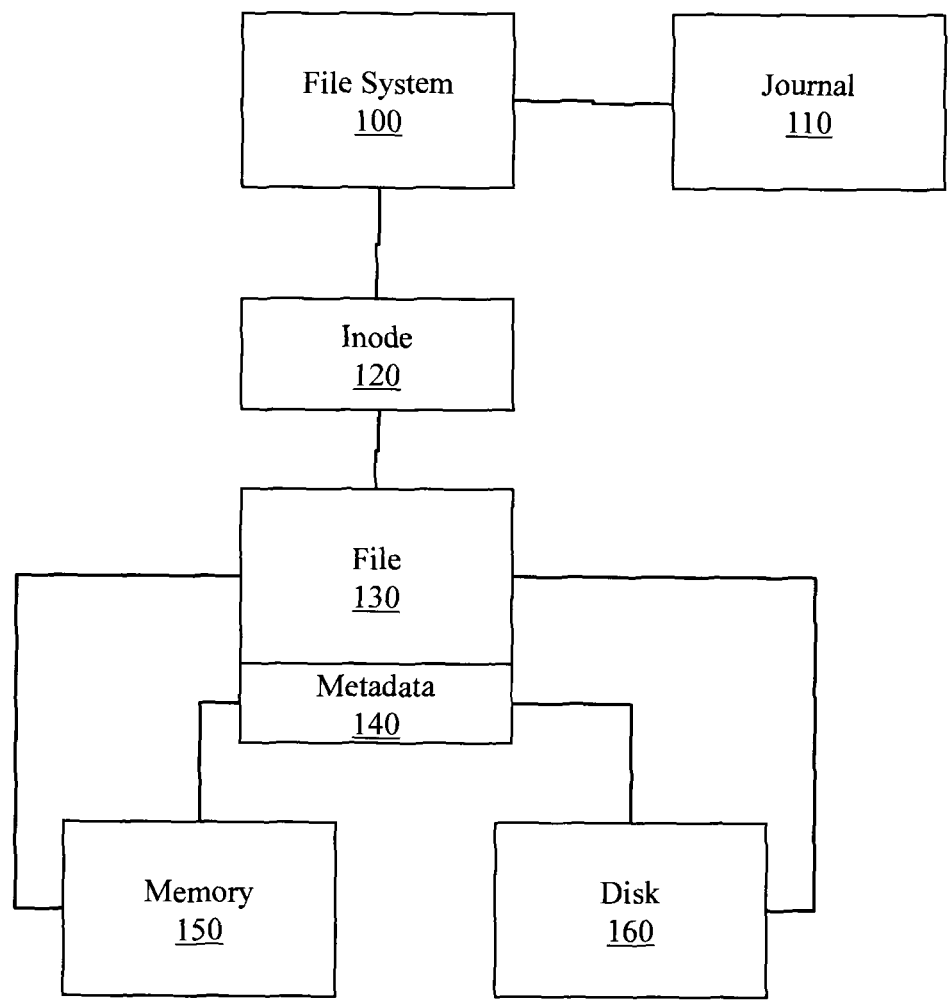
FIG. 1 illustrates a file system interacting with a journal.
Figure 2:
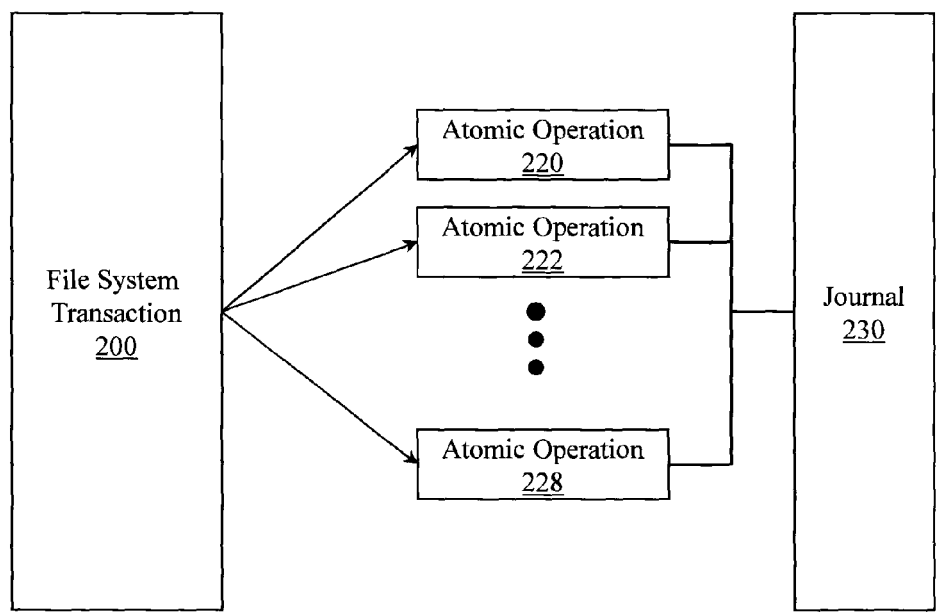
FIG. 2 illustrates a series of smaller atomic operations being treated as a larger atomic transaction by a file system.

Example apparatus and methods support heuristic journal reservations that improve file system economy by reducing memory needs, that improve file system efficiency by reducing metadata flushes, and that reduce file system complexity by eliminating costly worst-case scenario calculations. The heuristic journal reservations seek to produce reservations that are closer to the actual amount of journal space required for an operation. Having journal reservations that are more right-sized exerts less artificial pressure on the journal. Additionally, using observation based size allocations removes the need to compute the amount of storage required to accommodate a worst case scenario, which can be difficult and error prone to compute correctly.

When starting a file system transaction, space is required in the journal to record the operations associated with the transaction. The amount of space required may be difficult to calculate accurately. In one embodiment, the journal may be an on-disk circular buffer representing recent changes to the file system. This journal space is acquired before other resources are acquired because if the journal space is not available, there may be no point in acquiring other resources. Conventionally, since the amount of journal space needed may be difficult to calculate, the maximum amount of space is acquired in the journal to account for the worst-case scenario. However, few, if any, transactions consume the maximum amount of space. Therefore, example apparatus and methods may more intelligently allocate space in the journal for a transaction. The more intelligent estimate for journal space required may be based, for example, on a feedback mechanism that considers the recent history associated with a type of transaction.

One issue associated with allocating the maximum amount of space to accommodate the worst-case scenario is that journal space needs to be free before granting a reservation. Freeing the space may require flushing the actual metadata. Thus, allocating the maximum amount of space allocated to accommodate the worst case scenario may lead to additional and even unnecessary metadata flushes that could have been avoided if journal space was more intelligently allocated. Avoiding additional or unnecessary metadata flushes may improve system performance.

Flushing metadata before it actually needs to be flushed may produce inefficiencies because it may be desirable to hold metadata in memory for as long as possible without being flushed. For example, if a file is touched at a first time, its metadata changes at that first time. But, that file might be touched ten more times in the next second after the first time. Each of those touches would change the metadata. In some cases, only the last touch (e.g., for access time) may need to be recorded. If a system was forced to flush all ten changes, then ten disk i/o operations would be performed when only one was really needed to record the last change. Allocating too much free space for a transaction causes the journal to have to release space that is currently used, which requires flushing metadata, which may in turn produce unnecessary i/o operations. Therefore, reducing flushes by reducing the amount of storage allocated for transactions can enhance system performance.

Conventionally, since it may have been considered too computationally complex to calculate the amount of space that a particular transaction would consume, a worst case size was assumed. The worst case size was routinely many times the amount of space that was actually used. Overallocating memory in this way caused extra and unnecessary pressure on the space in the journal, which in turn forced extra and unnecessary metadata flushes. Not only did allocating the maximum amount of memory to accommodate the worst case scenario create this file system overhead, but the actual estimate of the worst case scenario was difficult to compute. In some cases, the errors in computing the worst case scenario can lead to deadlocks. When other optimizations (e.g., compressed records) were attempted, the differences between worst case scenario and actual usage may have been even greater.

Example apparatus and methods move away from a hard calculated journal reservation scheme to a more flexible approach where reservation overflow is allowed and where reservation size may be dynamically calculated based on observed recent behavior in the system. Thus, rather than relying on a difficult to compute worst case scenario allocation size, example apparatus and methods observe what is actually occurring with different transaction types and customize journal reservations based on those observations.

In one example, a per-transaction-type table is employed. The table may be seeded with an initial fixed value. In one embodiment, the fixed value may be selected based on information available from other systems. As transactions complete, the actual space used by the transactions is observed. The actual space used is then used to adjust entries in the table. In one example, a rolling average of the last N transactions may be computed. N may be, for example, 16, 32, 128, or other numbers. In one example, N may be adjusted based, for example, on the variance between the current value in the table and the observed values.

If the amount allocated for a transaction is insufficient for the transaction, then the transaction may still be allowed to proceed. The overflowing transaction may be allocated space in, for example, an overflow buffer. When an overflow occurs, the table may be adjusted directly rather than based on a rolling average or other time-influenced approach. For example, when an overflow occurs the table value may be doubled, quadrupled, or increased by another amount. In another embodiment, rather than adjusting the table directly, the transaction that caused the overflow may be weighted more heavily in a rolling average calculation. For example, a transaction that causes an overflow may be weighted ten times higher than a transaction that does not cause an overflow. In another embodiment, the sum of the rolling average may be doubled or multiplied by some other multiple or adjusted upwards in some other way.

In one embodiment, the amount of space reserved may be multiple of the table value or, of the rolling average. For example, the actual space reserved may be a power of two greater than the average. By default, the power of two may begin at one. If a certain transaction type overflows more than a threshold number of times in a period then the multiplier may be increased. While a multiplier is described, in different embodiments, other weighting factors (e.g., additive, fractional) may be employed.

Some file system transactions may operate on more than one file at a time. Similarly, some file system operations may operate on more than one file at a time. In one example, these operations may be referred to as bulk operations. In one embodiment, reservations for bulk operations may receive a multiple of the space that would be allocated in the journal for a single operation. The multiple may be a function of the number of files to which the bulk operation is to be applied.

In one embodiment, a portion of the journal is reserved as an overflow buffer to deal with transactions that use more than their reserved space. For example, a free space calculation that determines that a reservation can be granted may include setting aside the overflow buffer. When the journal is a circular buffer, the overflow buffer may facilitate preventing tail overwrites.

In one embodiment, a determination may be made before space is allocated in the journal for a transaction. The determination may consider whether a transaction is likely to overflow the journal. If the determination is that the transaction will or is likely to overflow the journal, then the reservation may be denied. In this example, the transaction may be aborted and retried with a larger initial reservation, or may be delayed to a later time when more journal space may be available.

In summary, example apparatus and methods do not reserve journal space according to a worst-case scenario basis but rather reserve journal space based, at least in part, on an observation based approach. Heuristic approaches determine appropriate right-sized amounts of memory to allocate. The heuristic approaches may reduce estimates slowly when observed usage is less than a prior estimate and may increase estimates quickly when an overflow occurs. By using less memory per journal allocation, fewer metadata flushes may be forced and fewer journal overflows may be experienced. If a journal overflow occurs, example apparatus and methods may account for the overflow using a buffer that has been set aside for the overflow. Additionally, when a journal overflow occurs, a transaction type that caused the overflow may have its observational based journal allocation estimate revised upwards.

Example apparatus and methods employ a heuristic for free journal space allocation. The heuristic tracks actual usage and tracks whether a transaction does or does not exceed the free space allocated to it. When the transaction uses less than the allocated free space, a subsequent allocation may be slightly smaller. If the transaction approaches or exceeds the allocated free space, a subsequent allocation may be larger, and even significantly larger. In one embodiment, the heuristic slowly shrinks estimates for free space required for a transaction but quickly grows estimates. In one embodiment, the heuristic produces a decaying average of recent observations multiplied by a safety factor.

Additionally, to prevent a journal overflow, which might happen even in conventional worst-case scenario mode, a percentage of the journal is set aside as an overflow buffer. In the unlikely but potentially disastrous event that a journal overflow is about to occur, the set aside buffer can be employed to prevent the disaster. If the set aside buffer is touched, the estimates for the space necessary to allocate for a transaction will be increased quickly (e.g., doubled, quadrupled). If a transaction type overflows or approaches overflow more than once in a threshold number of transactions (e.g., 10,000), then the increase may be accelerated. For example, if the estimate was doubled the last time it was increased, it may be quadrupled on the next occurrence.

Figure one illustrates a file system 100 interacting with a journal 110. While a user may refer to a file 130 using a file name, the file system 100 may refer to the file 130 using an inode 120. When a change is made to the file 130, there may also be a change to the metadata 140 of the file. The metadata 140 may include, for example, the name of a file, the size of a file, the owner of a file, the most recent access time of a file, and other information. In some occurrences, the updated file 130 may be stored in memory 150. Similarly, in some occurrences, the updated metadata 140 may be stored in memory 150. Ultimately, the updated file 130 and the updated metadata 140 may be stored on disk 160. While there are changes that have been made only in memory 150, the journal 110 may be used to protect those changes.

Figure two illustrates a conceptually large file system transaction 200 that actually includes a series (e.g., 220, 222, . . . 228) of smaller atomic operations. The series of atomic operations may be recorded, in order, in the journal 230 to protect the larger file system transaction 200. An operating system or other infrastructure may only be able to guarantee completion of the individual atomic operations. Therefore, having the series recorded in the journal 230 may facilitate rolling back a transaction if necessary. Before storing the series of atomic operations in the journal 230, space has to be reserved in the journal 230. Since the exact amount of space may be difficult or impossible to predict, example systems employ a heuristic approach to estimate improved right-sized reservations for transactions.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and other similar terms, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

ASIC: application specific integrated circuit.
CD: compact disk.
CD-R: CD recordable.
CD-RW: CD rewriteable.
DVD: digital versatile disk and/or digital video disk.
HTTP: hypertext transfer protocol.
LAN: local area network.
RAM: random access memory.
DRAM: dynamic RAM.
SRAM: synchronous RAM.
ROM: read only memory.
PROM: programmable ROM.
SSD: solid state drive
SAN: storage area network.
USB: universal serial bus.
WAN: wide area network.

"Computer component", as used herein, refers to a computer-related entity (e.g., hardware, firmware, software in execution, combinations thereof). Computer components may include, for example, a process running on a processor, a processor, an object, an executable, a thread of execution, and a computer. A computer component(s) may reside within a process and/or thread. A computer component may be localized on one computer and/or may be distributed between multiple computers.

"Computer-readable medium", as used herein, refers to a non-transitory medium that stores instructions and/or data. A computer-readable medium may take forms, including, but not limited to, non-volatile media, and volatile media. Non-volatile media may include, for example, optical disks, magnetic disks, and other disks. Volatile media may include, for example, semiconductor memories, dynamic memory, and other memories. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

"Data store", as used herein, refers to a physical and/or logical entity that can store data. A data store may be, for example, a database, a table, a file, a data structure (e.g. a list, a queue, a heap, a tree) a memory, a register, or other repository. In different examples, a data store may reside in one logical and/or physical entity and/or may be distributed between two or more logical and/or physical entities.

"Logic", as used herein, includes but is not limited to hardware, firmware, software in execution on a machine, and/or combinations of each to perform a function(s) or an action(s), and/or to cause a function or action from another logic, method, and/or system. Logic may include, for example, a software controlled microprocessor, a discrete logic (e.g., ASIC), an analog circuit, a digital circuit, a programmed logic device, or a memory device containing instructions. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

An "operable connection", or a connection by which entities are "operably connected", is one in which signals, physical communications, or logical communications may be sent or received. An operable connection may include a physical interface, an electrical interface, or a data interface. An operable connection may include differing combinations of interfaces or connections sufficient to allow operable control. For example, two entities can be operably connected to communicate signals to each other directly or through one or more intermediate entities (e.g., processor, operating system, logic, software). Logical or physical communication channels can be used to create an operable connection.

"Signal", as used herein, includes but is not limited to, electrical signals, optical signals, analog signals, digital signals, data, computer instructions, processor instructions, messages, a bit, or a bit stream, that can be received, transmitted and/or detected.

"Software", as used herein, includes but is not limited to, one or more executable instructions that cause a computer, processor, or other electronic device to perform functions, actions and/or behave in a desired manner.

"Software" does not refer to stored instructions being claimed as stored instructions per se (e.g., a program listing). The instructions may be embodied in various forms including routines, algorithms, modules, methods, threads, or programs including separate applications or code from dynamically linked libraries.

"User", as used herein, includes but is not limited to one or more persons, software, logics, applications, computers or other devices, or combinations of these.

Some portions of the detailed descriptions herein are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated. The physical manipulations create a concrete, tangible, useful, real-world result.

It has proven convenient at times, principally for reasons of common usage, to refer to these signals as bits, values, elements, symbols, characters, terms, or numbers. It should be borne in mind, however, that these and similar terms are to be associated with the appropriate physical quantities and are merely convenient labels applied to these quantities. Unless specifically stated otherwise, it is to be appreciated that throughout the description, terms including processing, computing, and determining refer to actions and processes of a computer system, logic, processor, or similar electronic device that manipulates and transforms data represented as physical (electronic) quantities.

Example methods may be better appreciated with reference to flow diagrams. For purposes of simplicity of explanation, the illustrated methodologies are shown and described as a series of blocks. However, it is to be appreciated that the methodologies are not limited by the order of the blocks, as some blocks can occur in different orders or concurrently with other blocks from that shown and described. Moreover, less than all the illustrated blocks may be required to implement an example methodology. Blocks may be combined or separated into multiple components. Furthermore, additional or alternative methodologies can employ additional, not illustrated blocks.

Figure 3:
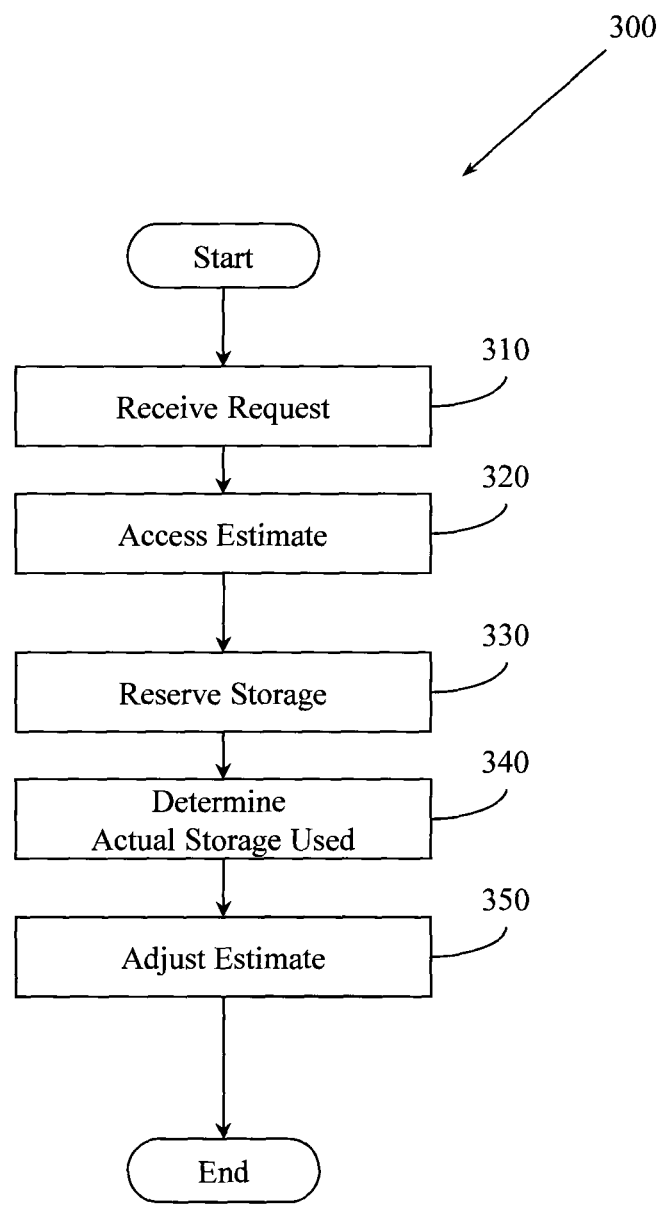
FIG. 3 illustrates an example method associated with heuristic journal reservations.

FIG. 3 illustrates a method 300 associated with heuristic journal reservations. Method 300 includes, at 310, receiving a request to allocate space in a journal. The request may be received, for example, from a file system, from an operating system, from an application, or from other computer processes. The journal may be, for example, a circular buffer. The request may be associated with, for example, a file system transaction. The file system transaction may require several smaller operations to complete before the transaction can be considered complete. For example, the file system transaction may require that a file be opened, that three writes occur, that one delete occur, and that the file be closed.

Method 300 also includes, at 320, accessing an estimate of the amount of journal space required to support the file system transaction. The estimate may be, for example, a pre-determined estimated reservation size. The pre-determined estimated reservation size may have been computed from observations of previous activity for similar transactions. Accessing the estimate may include reading a value from a data structure, reading a value from a data store, receiving a message from an estimate thread or process, or other actions. The pre-determined estimated reservation may be stored in, for example, a table. In one embodiment, a table may store entries on a per-transaction type basis. While a table is described, other data stores may be employed.

Method 300 also includes, at 330, reserving an amount of storage in the journal for the file system transaction. Reserving the storage may include actions like establishing pointers, establishing boundaries, updating a reservation table, updating a data structure, or other actions. The amount of storage reserved is a function of the pre-determined estimated reservation size. For example, the amount of storage may be a multiple (e.g., 1.1, 2) of the estimated size. Other functions may be employed. In one example, reserving the amount of storage includes computing a derived estimate as a function of the pre-determined estimated reservation size and a weighting factor. In another example, where a file system transaction may be applied to multiple files, reserving the amount of storage may include computing a derived estimate as a function of the pre-determined estimated reservation size and the number of files to which the file system transaction is to be applied.

Method 300 also includes, at 340, determining an actual amount of storage used in the journal by the file system transaction. Determining the actual amount of storage may include observing the journal during or until the file system transaction is complete and identifying how much journal space was actually used. Observing the journal may include actions like tracking pointer positions, tracking boundaries, examining an allocation table, or other actions.

Method 300 also includes, at 350, selectively automatically adjusting the pre-determined estimated reservation size as a function of the actual amount of storage used. For example, if the actual amount of storage used was much less than the amount reserved, then the estimated reservation size for that transaction type may be revised down. However, if the actual amount of storage used was within a threshold amount of the amount reserved, then the estimated reservation size for that transaction type may be left unchanged. Additionally, if the actual amount of storage used exceeded the amount reserved, then the estimated reservation size for that transaction type may be revised up. Adjusting the pre-determined estimated reservation size may include, for example, writing a value to a data structure, writing a value to a data store, sending a message to an estimate thread or process, or other actions that produce a change in data stored in a computer memory.

Figure 4:
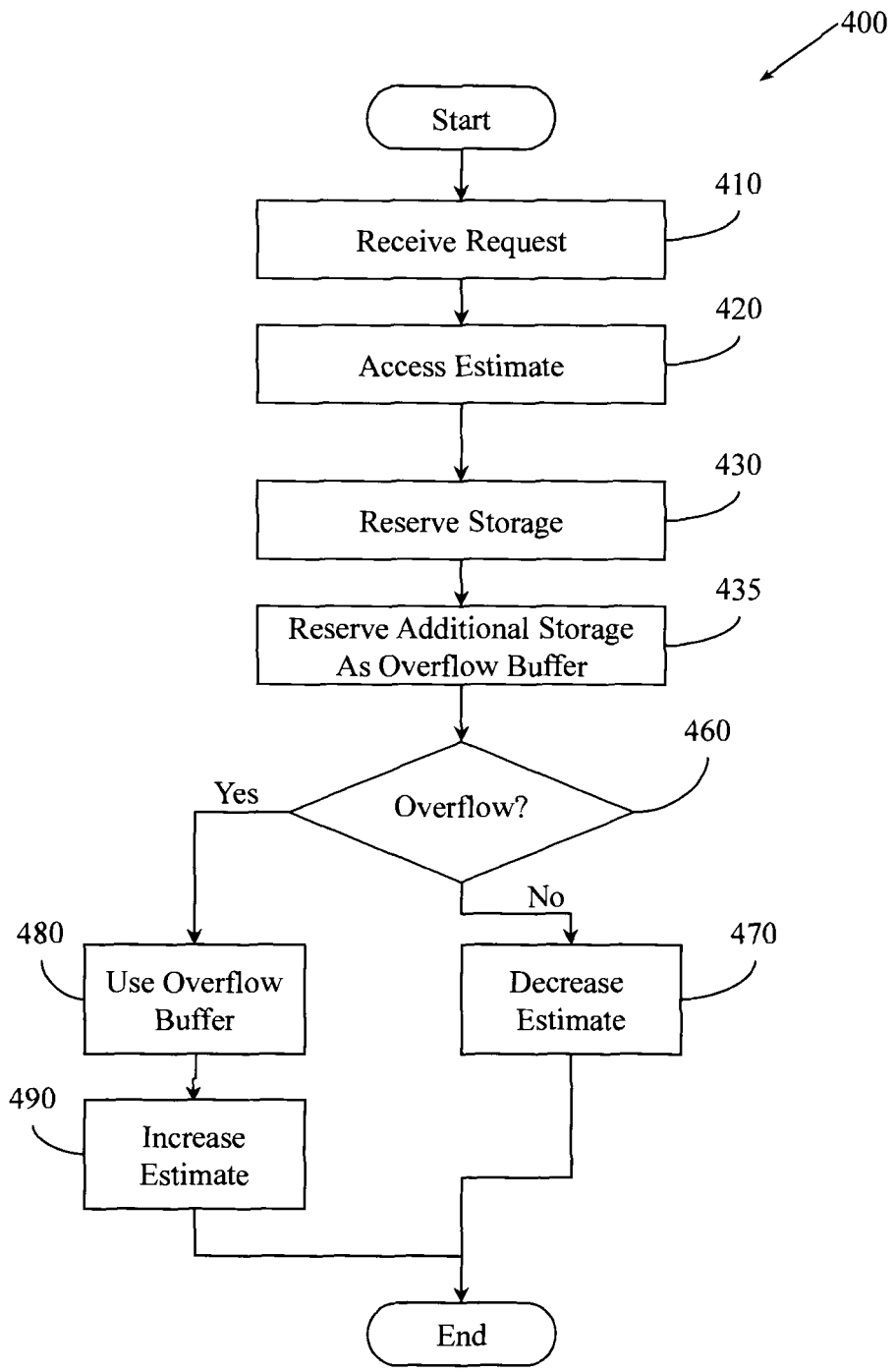
FIG. 4 illustrates an example method associated with heuristic journal reservations.

FIG. 4 illustrates a method 400 associated with heuristic journal reservations. Method 400 includes some actions similar to method 300. For example, method 400 includes receiving a request at 410, accessing an estimate at 420, reserving storage at 430, and determining the actual amount of storage used in the journal by the file system transaction. However method 400 includes additional actions and additional details.

For example, method 400 includes, at 435, reserving an additional amount of storage in the journal. The additional amount of storage is configured to operate as an overflow buffer. Thus, if a file system transaction overflows the amount of memory reserved for the transaction, the overflow buffer can be used to prevent undesirable actions including loss of metadata that has not yet been flushed or interrupting a transaction to flush metadata. Reserving the additional amount of storage may involve establishing pointers, establishing boundaries, marking a field in a reservation table, sending a message to a reservation thread or process, or other actions.

Method 400 also includes, at 460, determining whether the amount of storage actually used by the transaction will cause or has caused an overflow. Determining whether an overflow occurred may include comparing a head pointer to a tail pointer, examining a usage count, receiving a signal from a process, or other actions. If the determination at 460 is no, then the pre-determined estimate may be decreased at 470. In one embodiment, decreasing the pre-determined estimated reservation size is a function of a rolling average of observed storage usage. For example, a rolling average of the last N transactions can be maintained and when the average goes down, the estimate can be reduced. N may be, for example, 16, 32, 64, or other values. In one example, the rolling average may be a weighted rolling average of observed storage usage. The weightings may be used to make observations that are more than one standard deviation from the average have less impact on the average, to make outliers that are more than one standard deviation from the average have more impact on the average, or to account for other outliers in other ways. In one embodiment, the pre-determined estimate may be reduced by a pre-determined reduction amount (e.g., 16 bytes) or by a pre-determined reduction factor (e.g., 1%). In another embodiment, the pre-determined estimate may be reduced by a dynamic reduction amount (e.g., half the difference between the observed usage and the estimate) or by a dynamic reduction factor (e.g., half the average variance between the observed usage and the estimate). Other reduction approaches may be employed. In one embodiment, the estimate may only be reduced at 470 if the actual amount of storage used was less than the estimate by more than a threshold (e.g., 10%, 50%). Thus, in one embodiment, not all transactions that use less than the reserved amount of storage may cause the next reservation to be adjusted.

If the determination at 460 is yes, that the transaction caused an overflow, then the overflow buffer can be used at 480 and the pre-determined estimate can be increased at 490. In one embodiment, the pre-determined estimated reservation size is increased as a function of a rolling average of observed storage usage. If an overflow occurs, the estimate may be increased by, for example, a multiple (e.g., 2×, 4×) of the rolling average. In another embodiment, the estimate may be increased using a weighted rolling average of observed storage usage. For example, transactions that cause an overflow may be weighted more heavily (e.g., 10×) than transactions that do not cause an overflow. Similarly, transactions that come close to causing an overflow may be weighted more heavily (e.g., 5×) than transactions that do not come close to causing an overflow. A transaction may be deemed to have come close to causing an overflow when the actual storage used is within a threshold (e.g., 1%, 10%) of the amount of storage reserved. In other embodiments, the estimate may be increased by a pre-determined increase amount (e.g., 1 k), a pre-determined increase factor (e.g., 2×), a dynamic increase amount (e.g., twice the last increase amount), or a dynamic increase factor (e.g., twice what last increase factor). Using an allocation size based on the average size of related transaction produces a situation that reduces the likelihood that the system will even approach the overflow buffer area. Since the allocation size is based on the average size, transactions that exceed the average may be offset by transactions that are less than the average.

Although action 460 determines whether there was an overflow, in one embodiment, the pre-determined estimated reservation size may be a function of a number of overflows or a number of near-overflows experienced during a threshold number of observed preceding transactions. The threshold may be used to make more recent observations more relevant to the determination than observations that occurred at a much earlier time. Rather than waiting for a calamity (e.g., buffer overflow) to actually occur, example apparatus and methods may respond to a near-overflow where a transaction comes close to producing an overflow. A transaction may be deemed to have caused a near-overflow when the transaction used more than half of the reservation, when the transaction used more than 90% of the reservation, when the transaction used more than 99% of the reservation, or when other thresholds are crossed.

In one example, a method may be implemented as computer executable instructions. Thus, in one example, a computer-readable medium may store computer executable instructions that if executed by a machine (e.g., processor) cause the machine to perform methods 300 or 400. While executable instructions associated with methods 300 and 400 are described as being stored on a computer-readable medium, it is to be appreciated that executable instructions associated with other example methods described herein may also be stored on a computer-readable medium.

Figure 5:
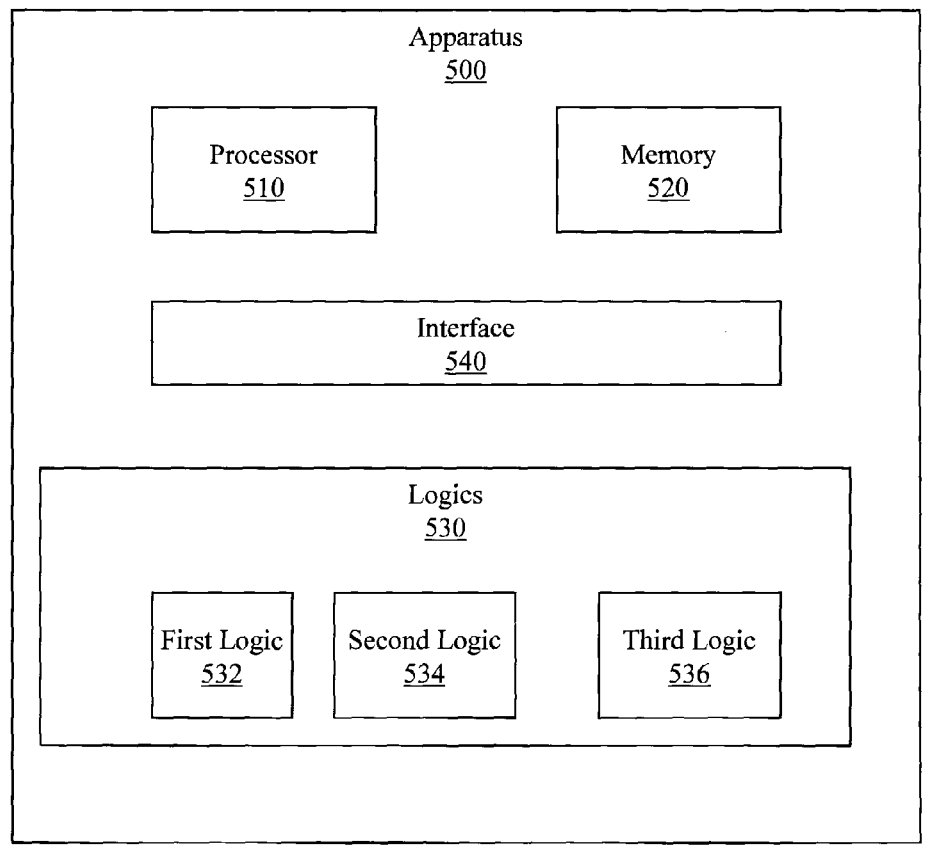
FIG. 5 illustrates an example apparatus associated with heuristic journal reservations.

FIG. 5 illustrates an apparatus 500 that includes a processor 510, a memory 520, and a set 530 of logics that is connected to the processor 510 and memory 520 by an interface 540. The memory 520 may be configured to store a journal impact estimate for a file system transaction. The journal impact estimate may have been produced from observations of previous file system transactions. The estimate may be stored in a table, in a database table, in a list, or in another data structure. As described above, having estimates that are sufficient to prevent overflows without being wastefully large facilitates improving file system efficiency and economy while reducing file system complexity.

The set 530 of logics may include a first logic 532 that is configured to determine a predicted journal usage for the file system transaction. The predicated journal usage may be computed as a function of the journal impact estimate. For example, the predicted journal usage may be computed as a multiple of the estimate stored in memory 520.

The apparatus 500 may also include a second logic 534 that is configured to control allocating storage in a journal. The amount of storage allocated may be a function of the journal usage predicted by the first logic 532. The predicted journal usage may depend on the type of transaction and may also depend on the number of files with which a file system transaction is associated. For example, a number of files may be moved from one directory to another directory, or an entire directory of files may be deleted. Thus, copy or delete transactions used in these directory operations may be associated with more than a single file. Therefore, in one embodiment, the second logic 534 may be configured to control allocating storage as a function of the predicted journal usage and the number of files associated with the file system transaction.

The apparatus 500 may also include a third logic 536 that is configured to selectively automatically adjust the journal impact estimate. The estimate may be adjusted as a function of a variance between an observed journal usage and the predicted journal usage. In one embodiment, the third logic 536 may be configured to adjust the journal impact estimate down at a rate determined as a function of observations of N previous file system transactions, N being an integer greater than one. In one embodiment, the third logic 536 may be configured to adjust the journal impact estimate down upon determining that the observed journal usage was less than the predicated journal usage by a first threshold amount.

In another embodiment, the third logic 536 may be configured to adjust the journal impact estimate up at a pre-determined rate upon determining that the observed journal usage was greater than the predicated journal usage by a second threshold amount. Since an overflow or a potential overflow may have undesirable results, example apparatus and methods may reduce estimates slowly while rapidly increasing estimates when an overflow or near overflow is detected. Thus, in one embodiment, the pre-determined rate at which the estimate is increased may be at least double the rate produced as a function of the observations of the N previous file system transactions. In another embodiment, the pre-determined rate at which the estimate is increased may be four times, eight times, or other times greater than the rate at which the estimate is decreased.

Figure 6:
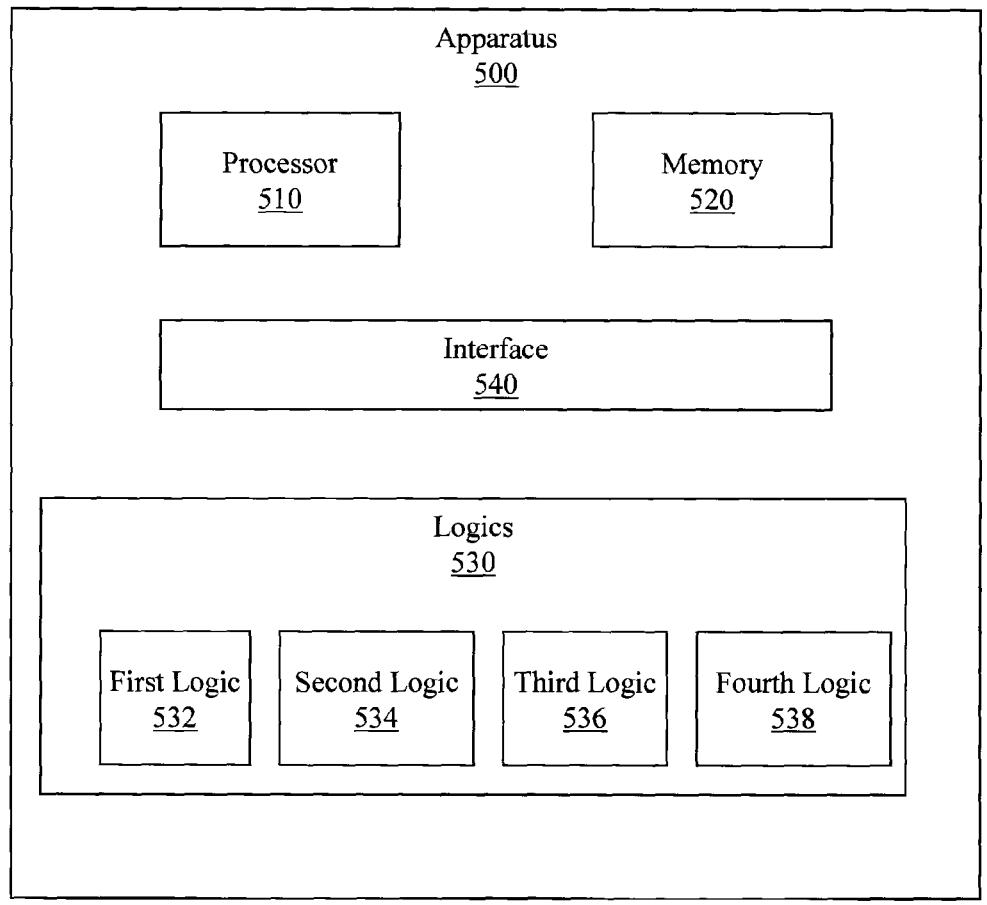
FIG. 6 illustrates an example apparatus associated with heuristic journal reservations.

FIG. 6 illustrates another embodiment of apparatus 500. This embodiment includes a fourth logic 538. The fourth logic 538 may be configured to allocate an overflow buffer in the journal for the transaction. The fourth logic 538 may also be configured to determine that the file system transaction will produce journal usage greater than the predicted journal usage. In one embodiment, if the fourth logic 538 determines that an overflow has occurred, then the fourth logic 538 will control the apparatus 500 to use the overflow buffer to accommodate the file system transaction. In another embodiment, if the fourth logic 538 determines that an overflow may be imminent, then the fourth logic 538 may control the apparatus 500 to use the overflow buffer to accommodate the file system transaction.

Figure 7:
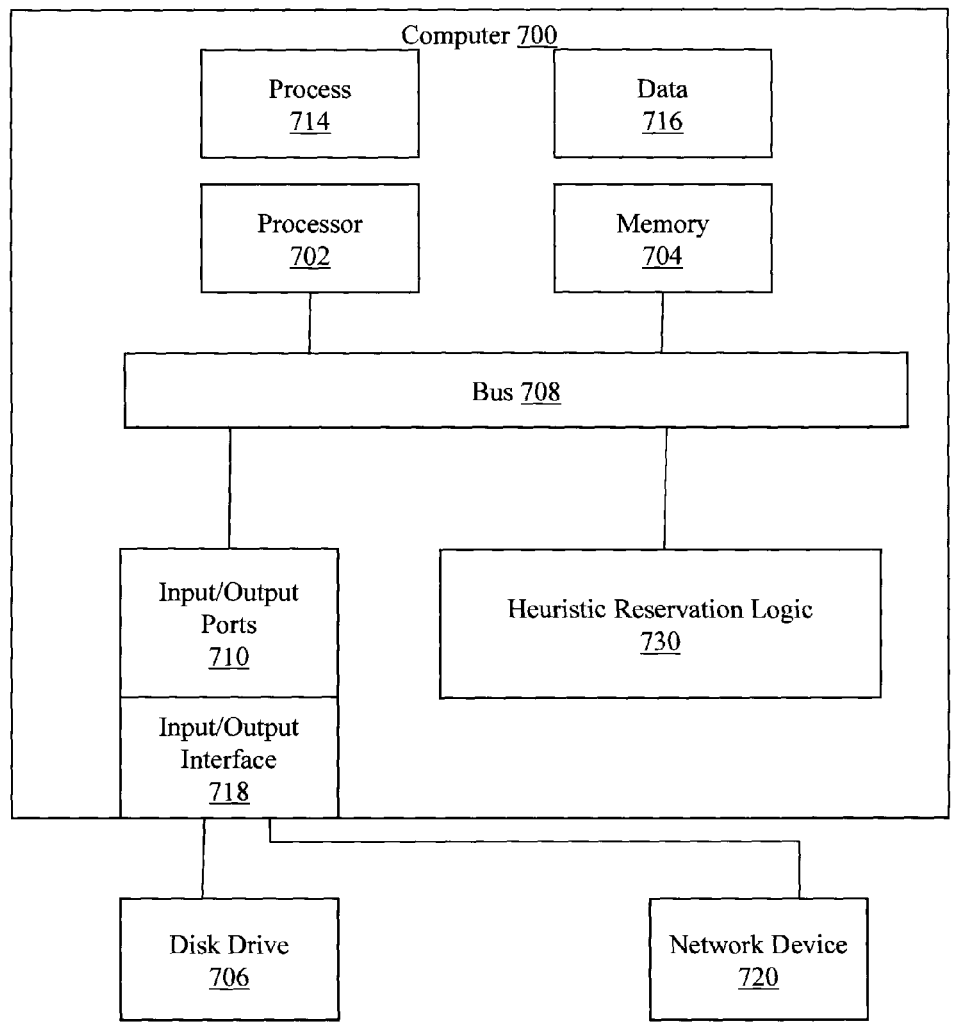
FIG. 7 illustrates an example apparatus associated with journal reservations.

FIG. 7 illustrates an example computing device in which example systems and methods described herein, and equivalents, may operate. The example computing device may be a computer 700 that includes a processor 702, a memory 704, and input/output ports 710 operably connected by a bus 708. In one example, the computer 700 may include a heuristic reservations logic 730 configured to facilitate providing improved sized allocations for a journal protecting a file system. In different examples, the logic 730 may be implemented in hardware, software, firmware, and/or combinations thereof. While the logic 730 is illustrated as a hardware component attached to the bus 708, it is to be appreciated that in one example, the logic 730 could be implemented in the processor 702.

Thus, logic 730 may provide means (e.g., hardware, software, firmware) for reserving storage in a journal. The storage may be configured to accommodate a plurality of atomic operations associated with completing a file system transaction of a first type. The amount of storage reserved is a function of an existing reservation size associated with the first type of file system transaction. Different types of file system transactions may have different reservation sizes that may be manipulated individually by observing actual processing of file system transactions of the different types.

Logic 730 may also provide means (e.g., hardware, software, firmware) for reserving additional storage in the journal, the additional storage being configured to accommodate an overflow of the journal. Reserving storage may include, for example, writing a value into a pointer, writing a value into a variable, storing an address in a register, or other actions.

Logic 730 may also provide means (e.g., hardware, software, firmware) for updating the existing reservation size as a function of observing an actual amount of storage used in the journal by transactions have the same type as the file system transaction. In one embodiment, the means for updating the existing reservation size is configured to reduce the reservation size upon determining that the actual amount of storage used in the journal by the file system transaction was less than the amount of storage reserved. In this embodiment, the existing reservation size is reduced as a function of a rolling average of observed storage used, as a function of a weighted rolling average of observed storage used, as a function of a pre-determined reduction amount, as a function of a pre-determined reduction factor, as a function of a dynamic reduction amount, or as a function of a dynamic reduction factor. Additionally, the means for updating the existing reservation size may be configured to increase the existing reservation size. The increase may occur upon determining that the actual amount of storage used in the journal by the file system transaction caused an overflow condition or a near overflow condition. When being increased, the existing reservation size may be increased according to a pre-determined increase amount or factor.

The means associated with logic 730 may be implemented, for example, as an ASIC. The means may also be implemented as computer executable instructions that are presented to computer 700 as data 716 that are temporarily stored in memory 704 and then executed by processor 702.

Generally describing an example configuration of the computer 700, the processor 702 may be a variety of various processors including dual microprocessor and other multi-processor architectures. A memory 704 may include volatile memory and/or non-volatile memory. Non-volatile memory may include, for example, ROM, PROM, and other memory. Volatile memory may include, for example, RAM, SRAM, DRAM, and other memory.

A disk 706 may be operably connected to the computer 700 via, for example, an input/output interface (e.g., card, device) 718 and an input/output port 710. The disk 706 may be, for example, a magnetic disk drive, a solid state disk drive, a floppy disk drive, a tape drive, a Zip drive, a flash memory card, a memory stick, or other device. Furthermore, the disk 706 may be a CD-ROM drive, a CD-R drive, a CD-RW drive, a DVD ROM drive, a Blu-Ray drive, an HD-DVD drive, or other device. The memory 704 can store a process 714 and/or a data 716, for example. The disk 706 and/or the memory 704 can store an operating system that controls and allocates resources of the computer 700.

The bus 708 may be a single internal bus interconnect architecture and/or other bus or mesh architectures. While a single bus is illustrated, it is to be appreciated that the computer 700 may communicate with various devices, logics, and peripherals using other busses (e.g., PCIE, 1394, USB, Ethernet). The bus 708 can be types including, for example, a memory bus, a memory controller, a peripheral bus, an external bus, a crossbar switch, and/or a local bus.

The computer 700 may interact with input/output devices via the i/o interfaces 718 and the input/output ports 710. Input/output devices may be, for example, a keyboard, a microphone, a pointing and selection device, cameras, video cards, displays, the disk 706, the network devices 720, and other devices. The input/output ports 710 may include, for example, serial ports, parallel ports, and USB ports.

The computer 700 can operate in a network environment and thus may be connected to the network devices 720 via the i/o interfaces 718, and/or the i/o ports 710. Through the network devices 720, the computer 700 may interact with a network. Through the network, the computer 700 may be logically connected to remote computers. Networks with which the computer 700 may interact include, but are not limited to, a LAN, a WAN, and other networks.

While example systems, methods, and other embodiments have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and other embodiments described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

What is claimed is:

1. A non-transitory computer-readable medium storing computer-executable instructions that when executed by a computer cause the computer to perform a method, the method comprising:
receiving a request to allocate space in a journal, the request being associated with a file system transaction;
accessing a pre-determined estimated reservation size for the file system transaction;
reserving an amount of storage in the journal for the file system transaction, where the amount of storage reserved is a function of the pre-determined estimated reservation size;
determining an actual amount of storage used in the journal by the file system transaction; and
selectively automatically adjusting the pre-determined estimated reservation size as a function of the actual amount of storage used, where adjusting the pre-determined estimated reservation size as a function of the actual amount of storage used includes reducing the pre-determined estimated reservation size at a first rate upon determining that the actual amount of storage used was less than the pre-determined estimated reservation size, or increasing the pre-determined estimated reservation size at a second rate upon determining that the actual amount of storage used was greater than the pre-determined estimated reservation size, where the second rate is at least twice the first rate.

2. The non-transitory computer-readable medium of claim 1, the journal being a circular buffer.

3. The non-transitory computer-readable medium of claim 2, the pre-determined estimated reservation size being stored in a table, where the table stores pre-determined estimated reservation sizes for different file system transaction types on a per transaction type basis.

4. The non-transitory computer-readable medium of claim 1, where reserving the amount of storage includes reserving an additional amount of storage in the journal, where the additional amount of storage is configured to operate as an overflow buffer.

5. The non-transitory computer-readable medium of claim 4, comprising:
upon determining that the transaction is going to cause an overflow, using the additional amount of storage to handle the overflow.

6. The non-transitory computer-readable medium of claim 1, where reserving the amount of storage includes computing a derived estimate as a function of the pre-determined estimated reservation size and a weighting factor.

7. The non-transitory computer-readable medium of claim 1, where reserving the amount of storage includes computing a derived estimate as a function of the pre-determined estimated reservation size and a number of files to which the file system transaction is to be applied.

8. The non-transitory computer-readable medium of claim 1, where reducing the pre-determined estimated reservation size is a function of a rolling average of observed storage usage, a decaying rolling average of observed storage usage, a weighted rolling average of observed storage usage, a pre-determined reduction amount, a pre-determined reduction factor, a dynamic reduction amount, or a dynamic reduction factor, where a change in observed storage usage that is more than one standard deviation from the rolling average of observed storage usage reduces the pre-determined estimate reservation size less than a change in observed storage usage that is less than one standard deviation from the rolling average of observed storage usage.

9. The non-transitory computer-readable medium claim 1, where increasing the pre-determined estimated reservation size is a function of a rolling average of observed storage usage, and a weighted rolling average of observed storage usage, a pre-determined increase amount, a pre-determined increase factor, a dynamic increase amount, or a dynamic increase factor.

10. The non-transitory computer-readable medium of claim 1, where increasing the pre-determined estimated reservation size is a function of a number of overflows or a number of near-overflows experienced during a threshold number of observed preceding transactions.

11. The non-transitory computer-readable medium of claim 1, where reserving the amount of storage in the journal includes computing a derived estimate by multiplying the pre-determined estimated reservation size by a multiple, and
where adjusting the pre-determined estimated reservation size as a function of the actual amount of storage used includes adjusting the multiple.

12. An apparatus, comprising:
a processor;
a memory that stores a journal impact estimate for a file system transaction;
a set of logics; and
an interface that connects the processor, the memory, and the set of logics;
the set of logics including:
a first logic that determines a predicted journal usage for the file system transaction as a function of the journal impact estimate;
a second logic that controls allocating storage in a journal as a function of the predicted journal usage, and
a third logic that selectively automatically adjusts the journal impact estimate as a function of a variance between an observed journal usage and the predicted journal usage, where the third logic adjusts the journal impact estimate down at a rate determined as a function of observations of N previous file system transactions, N being an integer greater than one, where the third logic adjusts the journal impact estimate down upon determining that the observed journal usage was less than the predicted journal usage by a first threshold amount, where the first threshold amount is less than one standard deviation from the predicted journal usage and where the third logic adjusts the journal impact estimate up at a pre-determined rate upon determining that the observed journal usage was greater than the predicted journal usage by a second threshold amount, where the pre-determined rate is at least double the rate produced as a function of the observations of the N previous file system transactions, and where the second threshold amount is less than one standard deviation from the predicted journal usage.

13. The apparatus of claim 12, where the second logic controls allocating storage as a function of the predicted journal usage and of the number of files associated with the file system transaction.

14. The apparatus of claim 12, the set of logics including a fourth logic that allocates an overflow buffer in the journal for the transaction and, upon determining that the file system transaction will produce journal usage greater than the predicted journal usage, uses the overflow buffer to accommodate the file system transaction.

15. A system, comprising:
means for reserving storage in a journal, where the storage is configured to accommodate a plurality of atomic operations associated with completing a file system transaction of a first type, where the amount of storage reserved is a function of an existing reservation size associated with the first type;
means for reserving additional storage in the journal, the additional storage being configured to accommodate an overflow of the journal, and
means for updating the existing reservation size as a function of observing an actual amount of storage used in the journal by transactions of the type of the file system transaction,
where the means for updating the existing reservation size is configured to reduce the existing reservation size upon determining that the actual amount of storage used in the journal by the file system transaction was less than the amount of storage reserved, where the existing reservation size is reduced at a first rate, where the first rate is a function of a decaying rolling average of observed storage used, and a weighted rolling average of observed storage used, a pre-determined reduction amount, a pre-determined reduction factor, a dynamic reduction amount, or a dynamic reduction factor, and
where the means for updating the existing reservation size is configured to increase the existing reservation size upon determining that the actual amount of storage used in the journal by the file system transaction caused an overflow condition, where the existing reservation size is increased at a second rate according to a pre-determined increase factor, where the second rate is at least twice as great as the first rate.

* * * * *